Oct. 4, 1966  J. J. FRY  3,276,288
HOUSING FOR VALVE ACTUATOR OR THE LIKE
Filed Dec. 20, 1963  3 Sheets-Sheet 1

INVENTOR.
JEREMY JOSEPH FRY
BY Edward B. Gregg
ATTORNEY

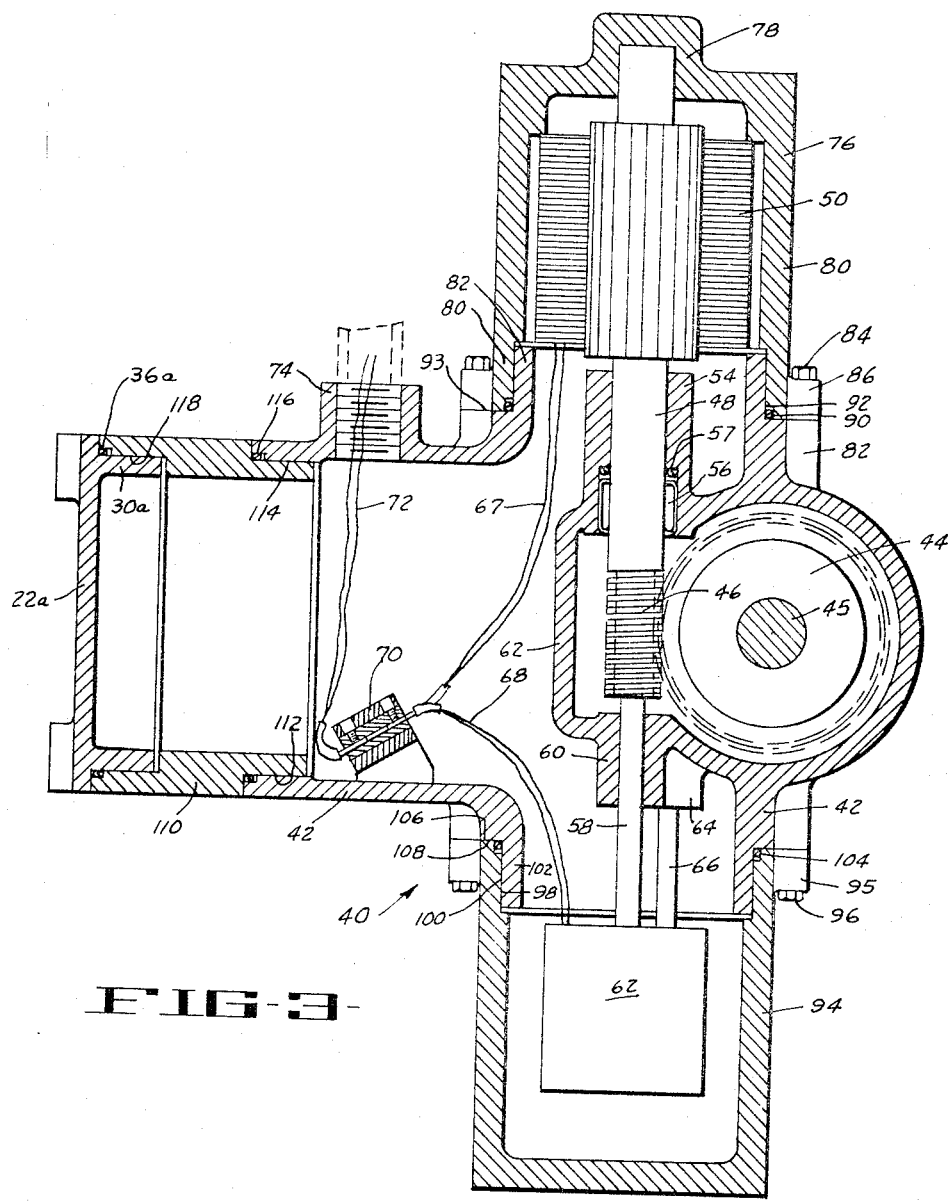

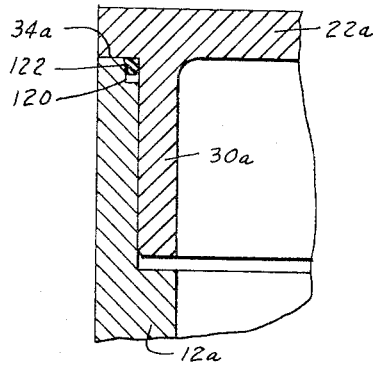
FIG-4-
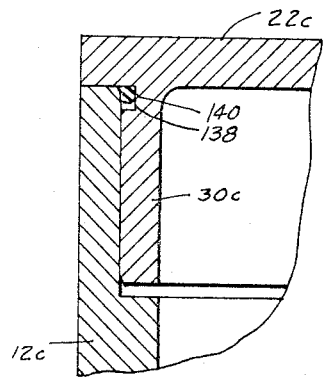
FIG-9-
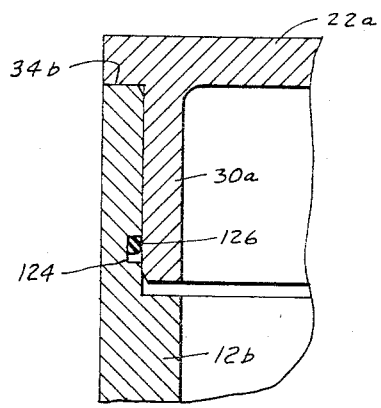
FIG-5-
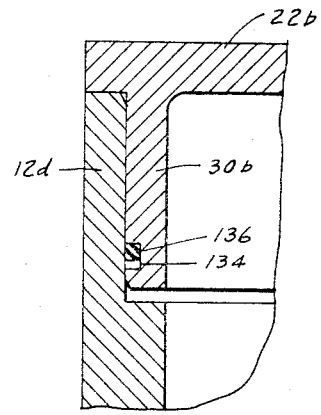
FIG-8-
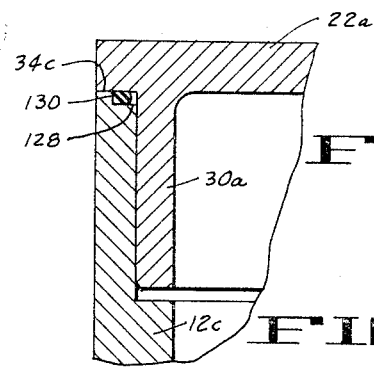
FIG-7-
FIG-6-
INVENTOR.
JEREMY JOSEPH FRY
BY
ATTORNEY

United States Patent Office 3,276,288
Patented Oct. 4, 1966

3,276,288
HOUSING FOR VALVE ACTUATOR OR THE LIKE
Jeremy Joseph Fry, Widcombe Manor, Bath, Somerset, England
Filed Dec. 20, 1963, Ser. No. 331,994
13 Claims. (Cl. 74—606)

This application is a continuation-in-part of my copending application Serial No. 175,769 filed February 26, 1962, now Patent No. 3,198,033.

This invention relates to a housing for a valve actuator or the like and more particularly, to a housing for a valve actuator and other electrically operated apparatus which are intended for use in atmospheres subject to contamination by explosive vapors, dusts or the like.

When electrical apparatus is employed in areas wherein combustible or explosive vapors or dusts are, or may be present, it must be enclosed in a housing that will confine the effects of any explosion that might occur to the housing itself in order to prevent injuries or property damage. Electrical apparatus may be used, for example, in valve actuators which are frequently installed in large valves such as may be employed in a pipeline to operate the valve by an electric motor through a suitable drive mechanism. When such valves are employed in pipelines through which oils, gasolines, naphtha, natural gases or other flammable materials are transmitted, an electrical spark from the motor or any other element of the electrical system in the presence of flammable vapors or dust is likely to cause an explosion. Insurance underwriters and safety engineers will not indulge in the presumption that housings for such valve actuators can be sealed to prevent the intrusion of flammable vapors. Consequently, they require that the housings be designed not merely to prevent an explosion but to confine the effects of such explosion to the housing itself.

Therefore, the housing must first be strong enough to withstand the force of the explosion. This requirement is normally not too difficult to achieve since the valve actuator housings are separate from the sealed valve bodies and are ordinarily at atmospheric pressure. Consequently, even in the extremely unlikely event that the internal pressure is increased tenfold as a result of an explosion, it will not exceed 150 lbs. per square inch. Such pressures do not present a difficult design problem.

However, the housing must also be designed to prevent flames from emitting through any openings in the housings. This requirement may be met by closing all openings with metal to metal contact and narrowly restricting the clearance between the metal surfaces but providing at least a given minimum length of path from interior to exterior between such metal surfaces. The metal to metal joint is required to conduct heat away and reduce the temperature of the gases to something below that necessary to support combustion. Consequently, it is essential that requirements of maximum clearance limitation and minimum flame path length (e.g., the width of a flanged joint) be closely observed. For example, in valve actuators, to be used in a location wherein gasoline, hexane, naphtha, natural gas or the like are or may be present, it may be required that all joints between the metal parts such as covers for access openings or the like, be a metal-to-metal joint with clearance restricted to no more than .002 inch over a path from interior to exterior of at least ½ inch in length. In certain instances, the limitation on clearance may be increased progressively with increase in length of path but in ordinary flange joints the use of seals in the joint would tend to increase the metal to metal clearance and may require an excessively large flange.

Significantly, the maximum clearance limitation relates solely to the clearance between metal parts and is not satisfied by the interposition of a seal or gasket. Such seals are generally not permitted in the plane of the joint. Consequently, design problems are encountered in the conventional flange-type closure plates wherein two flat surfaces are bolted together to close the vessel. If one sought to interpose a gasket or seal between the metal surfaces, the surfaces may be separated until clearance limitation requirements are exceeded, rendering the explosion-proof characteristics of the joint unacceptable. Even with an O-ring or similar seal disposed in a recess, underwriters tend to indulge in the presumption that the pressure between the flanges is concentrated at the seal and not between the metal surfaces. Hence, they deduce, the clearance limitations may be exceeded. Consequently, resilient seals, in conventional housings, may be detrimental to the provision of an explosion-proof joint.

However, the omission of such seals is not a satisfactory solution because their function to seal against entry of gases, moisture and other foreign matter is also of considerable importance. For example, a housing that is not completely sealed tends to "breathe" with fluctuations in temperature. A valve actuator housing exposed to the weather will often experience wide temperature variations from day to night with the heat of the sun expanding contained gases to force them out through the housing joints and the cold of night contracting the gases and causing ambient gases to enter the resultant low pressure zone. Moreover, the cooling also effects condensation of entrained vapors which, over a period of time, could produce considerable corrosive damage. While drains could be provided, it often becomes a problem to locate such drains since a housing may be mounted in various positions according to the requirements of the installation.

It is, therefore, an object of this invention to provide a housing for an electrically operated valve actuator that is totally sealed to the extent that it is submersible.

It is a further object of this invention to provide a housing for electrical apparatus that is both explosive-proof and totally sealed so as to be not merely weatherproof but submersible as well.

It is a further object of this invention to provide a housing for electrical apparatus wherein all openings are closed by members in metal to metal contact with snugly fitting finished parts providing a restricted flame path over a fixed length.

It is a further object of this invention to provide a housing for electrical apparatus wherein the joints between members covering housing openings and the housing itself are formed of sleeved couplings with cylindrical portions snugly fitting to provide a restricted flame path.

It is a further object of this invention to provide a housing for electrical apparatus wherein the joints between members are formed by snugly fitting cylindrical surfaces and such joints include a resilient seal.

In carrying out this invention, I provide a housing wherein all openings are surrounded by a smooth, finished cylindrical surface, either internal or external. Then, an enclosure plate or housing extension designed to cover the opening is formed with a cylindrical extension having a complementary, finished surface that snugly and slidably nests within or embraces, the cylindrical surface around the body opening. Additionally, the closure plate or body extension and the body itself have flat planer surfaces around the opening that are bolted or otherwise clamped together to complete the joint. Thus, the flame path between the planar surfaces, e.g., a flange coupling, is augmented by the restricted path between the cylindrical surfaces. Somewhere along the joint between the cylindrical or planar surfaces, I provide a resilient bubble-tight seal, preferably of the O-ring type which is located so as to leave an extensive path of metal to metal contact, axially along the cylindrical surfaces and radially between the planar surfaces to cool the gases to a temperature below that necessary to support combustion.

Other objects and advantages of this invention will become apparent from the description following when read in conjunction with the accompanying drawings, wherein:

FIG. 3 is a section view of a housing for a valve actuator, and

FIGS. 4 to 9 are partial section views of various forms of housing closure joints embodying features of this invention.

Figure 1:
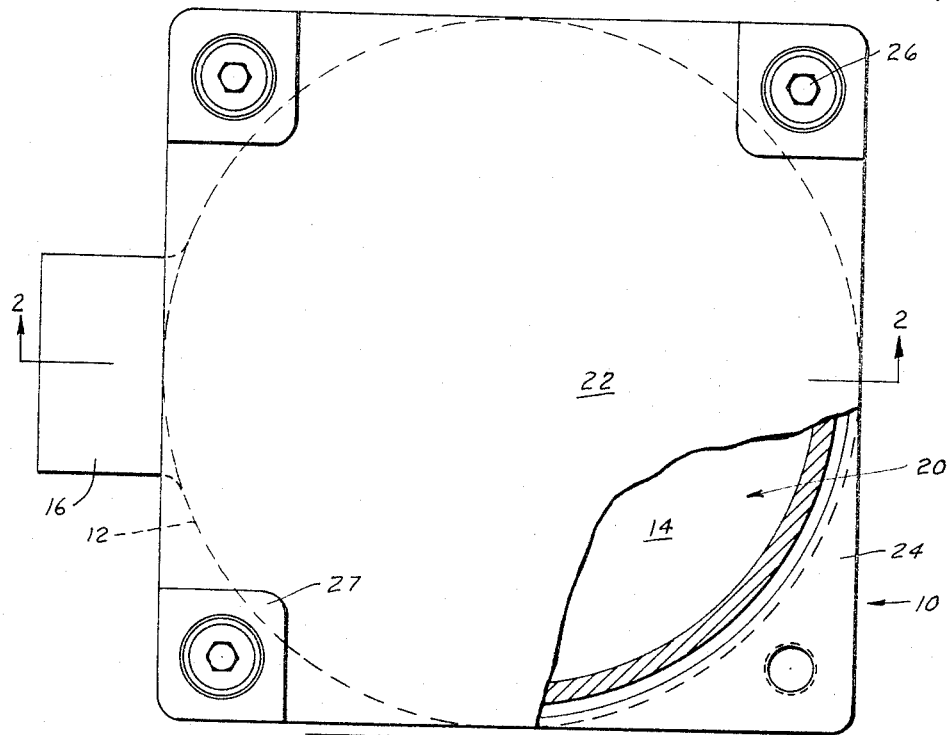
FIG. 1 is a top plan view with the cover partially cut away of a housing for a wide variety of electrical devices embodying features of this invention.
Figure 2:
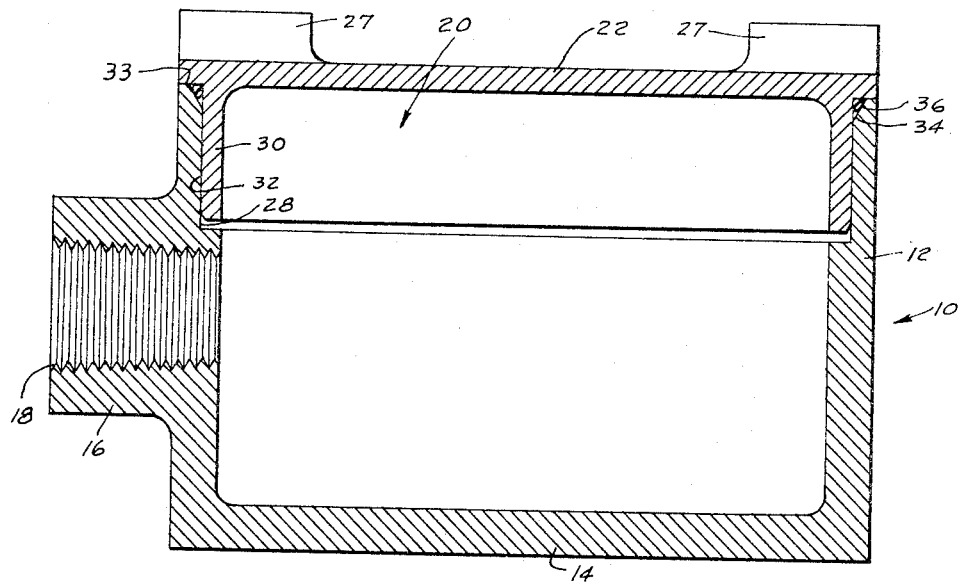
FIG. 2 is a section view taken along line 2—2 of FIG. 1.

Referring now to FIGS. 1 and 2, the housing 10 may comprise a hollow, cylindrical vessel including side walls 12 and an integral bottom plate 14. At one side of the housing 10 is a boss 16 having a tapered, internal pipe thread 18 adapted to receive a complementary electrical conduit pipe thread (not shown). The boss 16 is of sufficient axial length that the flame path provided through the joint clearance between the thread 18 and that of a mating pipe thread is of sufficient length to cool ignited gases to a temperature below that necessary to support combustion whereby the ignited gases will be extinguished. At the top of the housing 10 there is an access opening shown generally at 20 that is normally closed by a cover plate 22 which may be firmly clamped to flat, radial extensions 24 (FIG. 1) as by means of the cap screws 26 extending through the cover plate bosses 27, as shown. The inner surface of the cylindrical wall 12 is counterbored or otherwise undercut to a finished surface 28 of relatively close tolerances. Depending from the cover plate 22 is a cylindrical axial extension 30, the outer surface of which 32 is finished to close tolerances to fit snugly and slidably within the finished surface 28 of the cylindrical wall 12 in metal to metal contact. It is particularly important that the clearances between the finished surfaces 28 and 32 be strictly limited to provide a very restricted flame path. The cylindrical extension 30 is of sufficient axial length so that the heat of the ignited gases is dissipated in the metal of the cooperating cylindrical portions as the gas passes through the path provided between the finished surfaces 28 and 32, sufficient heat being conducted away to cool the ignited gases to a temperature lower than necessary to support combustion. Consequently, when the previously ignited gases exit at the edges of the cover plate 22 they have been extinguished. While this invention is not restricted to the particular dimensions of the finished surfaces 28 and 32 a typical joint of the type shown in FIG. 1 may have cylindrical metal to metal contact along an axial length of 1¼ inches with a radial clearance restricted to a maximum of .0045 inch. Such a joint may be progressively reduced in width to, say ½ inch, but the clearance must also be further restricted to something in the order of .002 inch. On the other hand, the clearance need not be held to such strict tolerances, if the flame path is long enough. Thus, it is conceivable that a clearance of from .005 to .010 is permissible in joints two inches and over in width.

While the vessel of FIGS. 1 and 2 has been described as having a cylindrical body 10 it is obvious that it may be formed in any one of many different configurations within the spirit and scope of this invention but for all practical purposes the opening 20 should be of circular configuration surrounded by a cylindrical surface, either internal or external, precisely formed so that a complementary cylindrical surface, similarly finished on the member attached to the body will form a spigot joint of snugly and slidably fitting finished cylindrical surfaces with minimum clearance between them.

Around the annular top edge 33 of the cylindrical side wall 12 is a seal ring recess 34 which may be formed by chamfering the top edge 33. Compressed between the chamfered portion 34 and the cover 22 is an O-ring 36 which provides a fluidtight seal that renders the housing 10 weather tight and even submersible. In addition, the seal 36 substantially lessens the likelihood that any combustile vapors or fluid will enter the housing 12 in the first place.

Referring now to FIG. 3, this invention is applied specifically to a valve actuator 40 including a main housing portion 42 in which is rotatably mounted a gear 44 on a shaft 45 which is adapted to be coupled or otherwise connected by any suitable means (not shown) to the operating stem of a fluid control valve, such as a gate valve, ball valve or the like. While the specific drive means illustrated is merely exemplary, it may include a worm 46 carried on a shaft 48 which is driven by a motor 50.

It will be noted that the worm 46, the worm gear 44 and the shaft 45 are contained in a sub-housing or vessel 52 that isolates them from the remainder of the main housing portion 42 in which the motor and other electrical devices to be described are situated. Thus, the sub-housing 62 retains the oil and grease of the gear unit and isolates it from the electrical devices. Additionally, since the shaft 45 must, of necessity, extend outside of the housing 40 for connection to the valve it operates (not shown), the sub-housing 52 is provided to isolate the remainder of the housing from the atmosphere to which the valve is exposed.

The shaft 48 is rotatably mounted in a boss 54 integral with the dividing chamber or sub-housing 52, and preferably is rotatably supported in suitable antifriction bearings 56. Since the bearings 56 assume the bearing load, the inner surface of the boss 54 is not subjected to excessive wear that would increase the clearance around the shaft 48. Alternatively, if it is desired to use a sleeve bearing, the boss 56 should be of sufficient length to meet flame path requirements considering a clearance around the shaft 48 after reasonable wear. Preferably, the shaft 48 is provided with a suitable grease seal 57 to keep oil and grease from flowing along the shaft 48 into the main housing 42.

I also provide a rod 58 that is slidably mounted in a second boss 60 extending from the sub-housing 52 and urged into engagement with the end of the shaft 48 so that if excessive torque is imparted to the shaft 45, as when the valve becomes jammed by a foreign article, the torque is transmitted to the shaft 48 axially and it, in turn, moves the rod 58 axially to operate a suitable limit switch shown generally at 62 to stop the motor 50.

A third boss 64 on the sub-housing 52 may rotatably carry a shaft 66 that is rotated by some portion of the valve operating mechanism, such as the stem (not shown) to activate or deactivate the motor 50 in response to valve position. The electrical conductors 67 and 68 connect the motor 50 and limit switches 62 to a suitable terminal block 70 to which electrical current is supplied by incoming conductors 72 extending through an internally threaded boss 74 on the main housing portion 42.

Since the interior of sub-housing 52 is exposed to the atmosphere of the housing 42, a potential flame path is provided along the shaft 48 from the interior of the sub-housing 52 into the main housing 42. Since the electrical system including the motor 50, the limit switches and the terminal block 74 constitute a potential flame igniter, this flame path must meet the requirements of an explosion-proof housing. Consequently, the enlarged bosses 54, 60 and 64 are precisely finished to close tolerance so that the flame paths around the shaft 48, the rod 58 and the shaft 66, respectively, do not exceed a given maximum clearance. Additionally, the bosses are formed to provide a path of sufficient length to meet explosion-proof requirements even considering reasonable bearing wear. As previously mentioned, the clearance around the motor-driven shaft 48 may be maintained within limits by providing the roller bearing 56 to carry the bearing load so that the shaft 48 will not enlarge the bore of the sleeve 54 through wear.

The motor 50 may be mounted in a cylindrical housing extension 76 including a closed bearing end 78, and an open, internally finished sleeve portion 80 that fits over a finished axial cylindrical protrusion 82 and is clamped to the main body portion by any suitable means, such as capscrews 84, passing through lugs or extensions 86 and threadedly engage into complementary lugs 88 on the main body portion 42. A seal ring 90 in recess 92 provides a bubble-tight seal when the annular surfaces 93 are brought into engagement to prevent any leakage at the joint. The cylindrical members 80 and 82 are finished to provide snugly fitting cylindrical surfaces which extend over a considerable axial length to provide the extensive flame path of reduced clearance.

Similarly, the limit switches 62 may be mounted in a cylindrical housing extension 94 having integral lugs 95 which are bolted at 96 to the main body portion 42. The extension 94 has an internal surface 98 finished to fit snugly over a complementary external cylindrical surface 100 on a cylindrical protrusion 102 on the main body portion 42. Again, a suitable seal such as O-ring 104 is provided to render the joint fluid tight as the flat planar surfaces 106 and 108 on the housing and extension, respectively, are brought into contact.

At the left in FIG. 3, I have shown an extension 110 that may be added in place of a cover plate 22a of the type shown in FIGS. 1 and 2 in order to add a chamber within the housing for installation of additional equipment as desired. The sleeve extension 110 is finished externally at one end 112 to fit snugly within the similarly finished internal surface 114 of the main body portion and an O-ring seal 116 is provided to render the joint fluidtight. At the other end the sleeve 110 is finished internally at 118 to provide a finished surface for reception of a complementary cylinder member of another sleeve or of the cylindrical extension 30a on a cover plate 22a. The cover 22a is secured in place within the sleeve 110 and a seal 36a is provided to render the joint fluid-tight.

Referring now to FIGS. 4 to 9, I have shown a number of different seals that may be employed in the sleeve or spigot joint of this invention. For example, in FIGS. 4 to 7, the cover 22a having an uninterrupted finished cylindrical extension 30a may be provided with a suitable seal being accommodated on the housing itself. Specifically, in FIG. 4 the housing 12a is formed with a recess 120 at the inner upper edge 34a so that the O-ring 122 is compressed between the bottom of the recess and the cylindrical surface of the complementary spigot joint element 30a. In FIG. 5 the recess 124 is displaced below the outer edge 34b of the housing so that an extensive metal flame path exists axially outward of the O-ring 126. It should be noted also that such O-ring seals on the cylindrical surfaces, as shown in FIGS. 4, 5, 8 and 9 cannot affect the clearance between such surfaces. The cylindrical dimensions are fixed by manufacture and the complementary snugly sliding surfaces will fit together or not with or without the O-ring. If they are properly formed and do fit, the O-ring will not distort them outside the clearance limitations.

In FIG. 6, the O-ring recess 128 is provided in the outer annular edge 34c so that the O-ring 130 is compressed between the bottom of the recess and the outer edge of the cover 22a. In FIG. 7, I disclose a structure wherein a flat annular gasket 132 is provided to seal between the cover 22a and the upper surface 34d of the housing 12d. In both the FIGS. 6 and 7 embodiments the seals could separate under surface of the cover 22a from the upper housing edge by an amount in excess of the clearance limitations. However, the cylindrical surfaces are of adequate axial length that the width of metal to metal contact is sufficient even with reasonable axial displacement occasioned by the interposition of seals.

In FIGS. 8 and 9 there are no seal recesses on the housing as in FIG. 7, but the O-ring recess is placed on the valve cover 22b. Specifically, in FIG. 8 the O-ring recess 134 is formed at the lower end of the cylindrical extension 30b to accommodate an O-ring 136 and in FIG. 9 a recess 138 for an O-ring 140 is formed at the top of the cylindrical extension 33 adjacent to the cover plate 22c.

While this invention has been described in connection with preferred embodiments thereof, it is apparent that modifications and changes therein may be made by those skilled in the art without departing from the spirit and scope of this invention as defined by the claims appended hereto.

Having described my invention, I claim:

1. An enclosure for a valve actuator comprising:
   a housing having an opening in one wall thereof,
   a closure member of a size and shape to cover said opening,
   complementary, snugly and slidably fitting, finished internal and external cylindrical surfaces on said housing and said closure member surrounding said opening,
   complementary planar faces on said housing and said closure member surrounding said opening,
   releasable means securing said closure member on said housing with said planar faces in engagement,
   a resilient seal member surrounding said opening in sealing engagement between said housing and said closure member,
   means forming a shaft opening in said housing,
   a shaft extending through said shaft opening,
   a sleeve having a finished, complementary internal cylindrical surface snugly embracing said shaft over a portoin of the length thereof, and
   portions around said sleeve sealing around said shaft opening, the radial clearances between complementary cylindrical surfaces being sufficiently small, and the axial lengths of said complementary surfaces exclusive of said seal member being sufficiently great that gases ignited within said housing are cooled to a temperature below that necessary to support combustion of such gases before completing flow through said clearances.

2. The valve actuator enclosure defined by claim 1 including:
   bearing means mounted on said housing rotatably supporting said shaft,
   said bearing means being axially displaced from said sleeve snugly embracing said shaft.

3. An enclosure for a valve actuator comprising:
   at least two housing elements connected together at joints to form a complete housing, each of said joints comprising:
      complementary, snugly and slidably fitting, finished internal and external cylindrical surfaces on said housing elements,
      complementary engaging planar faces on said housing elements,
      releasable means securing the housing elements of said joint together, and
      a resilient seal ring concentric with said cylindrical surface in sealing engagement between the house-elements of said joint, the radial clearances between said complementary cylindrical surfaces being sufficiently small, and the axial lengths of said complementary surfaces exclusive of said seal rings being sufficiently great that gases ignited within said housing are cooled to a temperature below that necessary to support combustion of such gases before completing flow through said clearances.

4. The enclosure defined by claim 1 wherein:
   each of said cylindrical surfaces is at least one-half inch in axial length, and the clearance between the cylindrical surfaces of each joint does not exceed .010 inch.

5. The enclosure defined by claim 1 wherein:
each of said cylindrical surfaces is between one-half and two inches in length, and
the clearance between the cylindrical surfaces of each joint is between .002 and .010 inch.

6. An enclosure for a valve actuator comprising:
housing having an opening in one wall thereof,
a closure member of a size and shape to cover said opening,
complementary, snugly slidably fitting, finished internal and external cylindrical surfaces on said housing and said closure member surrounding said opening,
complementary planar faces on said housing and closure member surrounding said opening,
releasable means securing said closure member on said housing with said planar faces in engagement, and
a resilient seal member surrounding said opening in sealing engagement between said housing and said closure member along the path provided by said cylindrical surfaces and planar faces, the radial clearance between said complementary cylindrical surfaces being sufficiently small, and the axial length of said complementary surfaces exclusive of said seal member being sufficiently great that gases ignited within said housing are cooled to a temperature below that necessary to support combustion of such gases before completing flow through said clearance.

7. The enclosure defined by claim 6 including:
a second opening on said housing,
a housing extension,
a second pair of complementary, snugly slidably fitting, finished internal and external cylindrical surfaces on said housing and said housing extension surrounding said second opening,
a second pair of complementary planar faces,
releasable means securing said housing extension on said housing with said planar faces in engagement, and
a resilient seal member surrounding said second opening in sealing engagement between said housing and said housing extension, the radial clearance between said second pair of complementary cylindrical surfaces being sufficiently small, and the axial length thereof exclusive of said seal member being sufficiently great that gases ignited within said housing are cooled to a temperature below that necessary to support combustion of such gases before completing flow through said clearance.

8. An enclosure for electrical apparatus comprising:
a housing having an opening in one wall thereof,
a closure member of a size and shape to cover said opening,
complementary, snugly slidably fitting finished internal and external cylindrical surfaces on said housing and said closure member surrounding said opening,
complementary engaging planar faces on said housing and said closure member,
releasable means securing said closure member on said housing, and
a resilient seal member surrounding said opening in sealing engagement between said housing and said closure member,
the radial clearance between said complementary cylindrical surfaces being sufficiently small, and the axial length thereof exclusive of said seal member being sufficiently great that gases ignited within said housing are cooled to a temperature below that necessary to support combustion of such gases before completing flow through said clearance.

9. The enclosure defined by claim 8 including:
complementary planar faces on said housing and closure member surrounding said opening and in firm engagement when said closure member is secured on said housing.

10. The enclosure defined by claim 8 including:
a second opening on said housing,
a housing extension,
a second pair of complementary, snugly slidably fitting, finished internal and external cylindrical surfaces on said housing and said housing extension surrounding said second opening,
a second pair of complementary planar faces,
second releasable means securing said housing extension on said housing with said planar faces in engagement, and
a second resilient seal member surrounding said second opening in sealing engagement between said housing and said housing extension, the clearance between said second pair of complementary cylindrical surfaces being sufficiently small, and the axial length thereof exclusive of said seal member being sufficiently great that gases ignited within said housing are cooled to a temperature below that necessary to support combustion of such gases before completing flow through said clearance.

11. The enclosure defined by claim 10 wherein:
said housing extension forms an imperforate closure for said second opening.

12. The enclosure defined by claim 10 wherein:
said housing extension is of tubular configuration having a third opening at the end thereof opposite said second pair of complementary planar faces,
a closure member of a size and shape to close said third opening,
a third resilient seal member surrounding said third opening in sealing engagement between said housing extension and said closure member, and
a third pair of complementary, snugly fitting, finished internal and external cylindrical surfaces on said housing extension and said closure member surrounding said third opening, the clearance between said third pair of complementary cylindrical surfaces being sufficiently small, and the axial length thereof exclusive of said seal member being sufficiently great that gases ignited within said housing are cooled to a temperature below that necessary to support combustion of such gases before completing flow through said clearance.

13. The enclosure defined by claim 8 including:
means forming a shaft opening in said housing,
a shaft extending through said shaft opening,
bearing means mounted on said housing and movably supporting said shaft, and
a sleeve having a finished internal cylindrical surface snugly embracing said shaft over a portion of the length thereof axially displaced from said bearing means, and
portions around said sleeve sealing around said shaft opening, the clearance between said sleeve and said shaft being sufficiently small, and the axial length thereof being sufficiently great that gases ignited within said housing are cooled to a temperature below that necessary to support combustion of such gases before completing flow through said clearance.

References Cited by the Examiner
UNITED STATES PATENTS

| 1,522,068 | 1/1925 | Morgan | 74—606 |
| 2,814,701 | 11/1957 | Rayer | 200—16 |
| 2,839,218 | 6/1958 | Zerbe | 220—46 |
| 3,007,600 | 11/1961 | Horner | 220—46 |

FRED C. MATTERN, Jr., *Primary Examiner.*

BROUGHTON G. DURHAM, *Examiner.*

W. S. RATLIFF, *Assistant Examiner.*